US006855388B2

(12) United States Patent
Springlholz et al.

(10) Patent No.: US 6,855,388 B2
(45) Date of Patent: Feb. 15, 2005

(54) BLOW MOULDED CONTAINERS AND MOULDED PARTS CONSISTING OF SYNTHETIC MATERIAL AND HAVING IMPROVED ANTISTATIC PROPERTIES

(75) Inventors: Bernhard Springlholz, Worms (DE); Wolfgang Rohde, Speyer (DE); Andreas Haufe, Ludwigshafen (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/221,846

(22) PCT Filed: Mar. 7, 2001

(86) PCT No.: PCT/EP01/02558

§ 371 (c)(1),
(2), (4) Date: Sep. 16, 2002

(87) PCT Pub. No.: WO01/68480

PCT Pub. Date: Sep. 20, 2001

(65) Prior Publication Data

US 2003/0021926 A1 Jan. 30, 2003

(30) Foreign Application Priority Data

Mar. 16, 2000 (DE) .......................... 100 13 000

(51) Int. Cl.[7] .................. B29D 22/00; B29D 23/00; B32B 1/08

(52) U.S. Cl. ............... 428/35.7; 428/500; 428/113; 428/119; 428/220; 428/297.4; 428/298.1

(58) Field of Search ............... 428/35.7, 36.1, 428/36.2, 36.4, 500, 113, 119, 212, 220, 292.1, 293.4, 293.7, 297.4, 297.7, 298.1, 299.1; 220/560.01, 562, 563, 567.2; 206/6, 524.1, 524.3

(56) References Cited

U.S. PATENT DOCUMENTS 3,330,439 A  * 7/1964 Moorman ............... 220/86
4,844,974 A  * 7/1989 McCullough, Jr. et al. . 428/288
6,105,676 A  * 8/2000 Alhamad ............... 169/45

FOREIGN PATENT DOCUMENTS

| DE | 297 19 911 | | 3/1998 |
| EP | 0 014 491 | | 8/1980 |
| JP | 59-153620 | * | 9/1984 ........... B60K/15/02 |

* cited by examiner

Primary Examiner—Harold Pyon
Assistant Examiner—Michael C. Miggins
(74) Attorney, Agent, or Firm—James C. Lydon

(57) ABSTRACT

The present invention relates to plastic containers or moldings which have been produced by blow molding and have improved antistatic properties. The containers or moldings have an outer wall and an inner wall and contain webs of electrically conducting material running along the inner wall. The invention also relates to a process for the production of the containers or moldings and to their use.

13 Claims, No Drawings ved antistatic properties which can be produced simply and economically in one step, but which exhibit no or only minor impairment of their mechanical properties.

BLOW MOULDED CONTAINERS AND MOULDED PARTS CONSISTING OF SYNTHETIC MATERIAL AND HAVING IMPROVED ANTISTATIC PROPERTIES

This application is a U.S. National Stage of International application PCT/EP01/02558, filed Mar. 7, 2001, and published on Sep. 20, 2001 in the German Language.

The present invention relates to plastic containers or mouldings which have been produced by blow moulding and have improved antistatic properties.

BACKGROUND OF THE INVENTION

Both various components of motor vehicles and containers for particular contents or use locations are required to have certain antistatic properties in their particular application in order to counter possible risks of explosion. Plastic parts and plastic containers have a disadvantage here compared with metal parts since the plastic as such does not conduct electrical current and is therefore unable to eliminate the electrical charges formed on surfaces, which is no problem for metals owing to their electrical conductivity. All conventional measures hitherto for improving the antistatic properties of plastic components are associated with disadvantages in other areas.

Antistatics added to plastics as an additive only act on the surfaces of the plastic walls in combination with moisture. They have no action if moisture does not reach the wall, and they entail the risk of entering the contents due to diffusion and contaminating the latter.

A known aid for, for example, rendering plastic tank fill necks antistatic consists of a wire spoke suspended in the plastic necks. It is connected to the tank cap and thus to the metal body, and consequently any electric charge which arises can be eliminated. In this procedure, problems consist in the time-consuming retrofitting of the metal spoke in the tank fill neck system, which otherwise consists entirely of plastic and is assembled by plastic joining methods.

Another variant consists in making the fill neck out of a plastic which is highly filled with electrically conductive carbon black. This makes the plastic wall itself conductive. Problems consist here in the reduced toughness of the plastic due to the high level of filling, which is reflected in impaired impact strength of the fill neck.

Corresponding carbon black-filled material grades are used for the production of antistatic canisters. Besides the reduced shock resistance, problems are also caused by the relatively poor weldability of the material, which results in poor pinch-off weld strengths in the canisters typically produced by blow moulding. The same applies in coextruded containers having a conductive inside layer, in which the pinch-off weld is likewise typically formed from material of the inside layer.

Especially in the case of so-called intermediate bulk containers (IBCs), i.e. large-volume containers which consist of an inner plastic container and an outer support device, usually of metal, and which are used for the transport and storage of liquid or powder-form chemicals, antistatic properties are produced by particularly close contact of the plastic with metal surfaces or external coating with a conductive material. However, problems consist here in the high consumption of material and/or additionally necessary working steps during manufacture.

SUMMARY OF THE INVENTION

The object of the present invention therefore consisted in providing plastic parts or plastic containers having improved antistatic properties which can be produced simply and economically in one step, but which exhibit no or only minor impairment of their mechanical properties.

This object is achieved in accordance with the invention by containers or mouldings of the generic type mentioned at the outset whose characterizing features are to be regarded as that the containers or mouldings have an outer wall and an inner wall, and that the containers or mouldings contain webs of electrically conductive material running along the inner wall.

In the present invention, suitable electrically conductive materials are materials which have a specific electrical volume resistance of at most $10^6$ ohm·cm ($\Omega$·cm), preferably at most $10^5$ $\Omega$·cm. Materials of this type are metals in any form or intrinsically non-conducting plastics which are filled with metal turnings or metal filaments or carbon fibres or conductive carbon black in sufficient amount or intrinsically electrically conducting plastics, such as substituted polythiophenes or similar polymers having conjugated double bonds.

DETAILED DESCRIPTION OF THE INVENTION

The webs can run along the inner wall of the containers or mouldings according to the invention in a variety of ways. For example, the webs can run crosswise in the form of networks or can be arranged in parallel. In the case of parallel running of the webs, the maximum separation between the individual webs should not exceed 20 mm, preferably 15 mm. In the case of crosswise running of the webs, the maximum coherent, non-conducting grid area should not exceed a size of 100 $cm^2$, preferably 80 $cm^2$. The total area of the inner wall of the containers or mouldings according to the invention which is covered by the webs of electrically conducting material should be at least 10%, preferably at least 20%, based on the total area of the inner wall.

The plastics employed for the containers or mouldings according to the invention are polyolefins obtained by polymerization of monomers having from 2 to 10 carbon atoms. The polymerization can be carried out either by the known gas-phase process, in high-pressure reactors, in loop reactors or by the slurry process in the presence of suitable polymerization catalysts. The plastic employed for the containers or mouldings according to the invention is preferably polyethylene, where, for the purposes of the present invention, the term polyethylene is to be taken to mean both homopolymers and copolymers of ethylene with other olefins having from 3 to 10 carbon atoms. The polyethylene can have a high density (HDPE), medium density (MDPE) or low density (LDPE) and may be linear (LLDPE) or branched.

The webs of electrically conducting material are applied directly to the inner wall of the parison during production of the containers or mouldings according to the invention during discharge of the plastic melt from the extruder into the blow mould in a modified coextrusion process and are inflated together with the parison to form the finished container or moulding. It is ensured here that the position of the webs in the extrusion direction and at the periphery of the moulding is controlled in such a way that the webs wherever possible do not run through pinch-off welds and wherever possible do not meet one another in pinch-off welds.

The peripheral position of the webs of electrically conducting material is controlled by a head/die region of the blow-moulding machine of corresponding design, while the position of the webs of electrically conducting material in the extrusion direction can be influenced by sequential discontinuous extrusion of the web layers.

The invention is preferably suitable for producing containers with an antistatic finish, such as bottles, canisters, drums, IBCs, or industrial mouldings, such as fuel canisters made of plastic or fill necks for fuel tanks in motor vehicles.

The advantage of the containers or mouldings according to the invention is that the webs of electrically conducting material do not contain any migrating additives, that the webs are introduced into the container or moulding in one step directly during the moulding process and without reworking, and that the webs hardly project into the pinch-off weld, or not at all, so that the antistatic finishing causes no or only very minor mechanical weakening of the container or moulding.

What is claimed is:

1. A plastic container or molding which has been produced by blow molding and has improved antistatic properties, comprising an outer wall and an inner wall, said inner wall having a web of electrically conductive thermoplastic material applied thereto during discharge of plastic melt from an extruder such that said web is inflated together with said plastic to form a container or molding, wherein said web is arranged on said inner wall crosswise in the form of a network or in parallel, and wherein a maximum separation between individual parallel webs is 20 mm, and wherein, in the case where the web is arranged in a network, a maximum coherent, non-electrically conducting grid area does not exceed a size of 100 cm$^2$.

2. The container or molding of claim 1, wherein said electrically conductive material comprises an intrinsically non-conducting plastic filled with a member of the group consisting of metal turnings, metal filaments, carbon fibers and conductive carbon black, or said electrically conductive material comprises an intrinsically conductive plastic containing conjugated double bonds.

3. The container or molding of claim 1, wherein said maximum separation between individual parallel webs is 15 mm.

4. The container or molding of claim 1, wherein said maximum coherent, non-electrically conducting grid area does not exceed a size of 80 cm$^2$.

5. The container or molding of claim 1, wherein said electrically conductive material has a maximum specific electrical volume resistance of $10^6$ Ω.cm.

6. The container or molding of claim 5, wherein said electrically conductive material has a maximum specific electrical volume resistance of $10^5$ Ω.cm.

7. The container or molding of claim 1, in which an area of the inner wall which is covered by said web of electrically conductive thermoplastic material is at least 10% based on a total area of said inner wall.

8. The container or molding of claim 7, wherein an area of the inner wall which is covered by said web of electrically conductive thermoplastic material is at least 20% based on the total area of said inner wall.

9. The container or molding of claim 1, wherein said container or molding is made of plastic obtained by polymerization of a monomer having from 2 to 10 carbon atoms, where the polymerization is carried out using a gas-phase process in a high pressure reactor or in a loop reactor or where the polymerization is carried out using a slurry process in the presence of a suitable polymerization catalyst.

10. The container or molding of claim 9, wherein said container or molding is made of polyethylene.

11. A process for the production of a container or molding according to claim 1, comprising melting a plastic in an extruder to form a molten plastic;

discharging said molten plastic from said extruder into a blow mold to produce a parison, and inflating the parison by compressed air and cooling the inflated parison, wherein said web of electrically conductive thermoplastic material is applied directly to an inner wall of said parison during discharge of the molten plastic from said extruder into said blow mold.

12. The process of claim 11, wherein the position of the web in the extrusion direction and at the periphery of the molding is controlled to avoid run through pinch-off welds and to avoid having one web meet another web in a pinch-off weld.

13. In a plastic container or molding having antistatic properties, the improvement comprising a web of electrically conductive thermoplastic material running along an inner wall of said container or molding, wherein said web is arranged on said inner wall crosswise in the form of a network or in parallel, said web being applied during discharge of plastic melt from an extruder such that said web is inflated together with said plastic to form a container or molding, and wherein a maximum separation between individual parallel webs is 20 mm, and wherein, in the case where the web is arranged in a network, a maximum coherent, non-electrically conducting grid area does not exceed a size of 100 cm$^2$.

* * * * *